United States Patent
Iotti

(10) Patent No.: US 12,312,224 B2
(45) Date of Patent: *May 27, 2025

(54) TELEHANDLER PROVIDED WITH IMPROVED CAB

(71) Applicant: MANITOU ITALIA S.R.L., Castelfranco Emilia (IT)

(72) Inventor: Marco Iotti, Reggio Emilia (IT)

(73) Assignee: MANITOU ITALIA S.R.L., Castelfranco Emilia (IT)

( * ) Notice: Subject to any disclaimer, the term of this patent is extended or adjusted under 35 U.S.C. 154(b) by 0 days.

This patent is subject to a terminal disclaimer.

(21) Appl. No.: 17/682,461

(22) Filed: Feb. 28, 2022

(65) Prior Publication Data
US 2022/0297993 A1  Sep. 22, 2022

(30) Foreign Application Priority Data
Mar. 19, 2021 (IT) ......................... 102021000006734

(51) Int. Cl.
*B66F 9/075* (2006.01)
*B32B 7/12* (2006.01)
(Continued)

(52) U.S. Cl.
CPC ............ *B66F 9/07545* (2013.01); *B32B 7/12* (2013.01); *B32B 17/10018* (2013.01);
(Continued)

(58) Field of Classification Search
CPC .......... B32B 17/10018; B32B 2250/03; B32B 2250/24; B32B 2250/40; B32B 2307/412;
(Continued)

(56) References Cited

U.S. PATENT DOCUMENTS 3,388,032 A * 6/1968 Saunders ................ C08B 11/08
428/441
4,592,947 A * 6/1986 Hunter .............. B32B 17/10018
156/313
(Continued)

FOREIGN PATENT DOCUMENTS

EP 3702316 A1 9/2020
JP H11291754 A 10/1999
(Continued)

OTHER PUBLICATIONS

Machine translation of JP-2007237890-A, retrieved Oct. 6, 2023. (Year: 2007).*

(Continued)

*Primary Examiner* — Callie E Shosho
*Assistant Examiner* — Krupa Shukla
(74) *Attorney, Agent, or Firm* — Chrisman Gallo Tochtrop LLP

(57) ABSTRACT

Described is a telehandler having a cab (1) equipped with a roof (10) defined by a transparent or semi-transparent protective cover (11) which comprises one or more materials designed to withstand the falling of hazardous material for the safety of an operator onboard the cab (1). The cover includes a plurality of layers made of polymeric material, including one made of polycarbonate (111, 112) or polyurethane (110).

27 Claims, 5 Drawing Sheets

(51) Int. Cl.
*B32B 17/10* (2006.01)
*B32B 27/08* (2006.01)
*B32B 27/36* (2006.01)
*B32B 27/40* (2006.01)

(52) U.S. Cl.
CPC ............ *B32B 27/08* (2013.01); *B32B 27/365* (2013.01); *B32B 27/40* (2013.01); *B32B 2250/03* (2013.01); *B32B 2250/24* (2013.01); *B32B 2250/40* (2013.01); *B32B 2307/412* (2013.01); *B32B 2307/732* (2013.01); *B32B 2605/006* (2013.01)

(58) Field of Classification Search
CPC . B32B 2605/006; B32B 27/08; B32B 27/365; B32B 27/40; B32B 7/12; B32B 2307/732
See application file for complete search history.

(56) References Cited

U.S. PATENT DOCUMENTS

| | | | | |
|---|---|---|---|---|
| 4,619,479 A | * | 10/1986 | Martin, Jr. | ......... B66F 9/07545 296/146.16 |
| 6,276,750 B1 | * | 8/2001 | Frisch | ................. B66F 9/07545 296/190.1 |
| 2007/0241583 A1 | | 10/2007 | Magni | |
| 2011/0177310 A1 | * | 7/2011 | Ryan | ....................... B32B 27/36 428/339 |
| 2017/0227333 A1 | * | 8/2017 | Villalobos | ............. B32B 27/365 |
| 2018/0364012 A1 | * | 12/2018 | Iotti | ........................ F41H 5/226 |
| 2020/0277172 A1 | | 3/2020 | Iotti | |

FOREIGN PATENT DOCUMENTS

| | | |
|---|---|---|
| JP | 2007237890 A * | 9/2007 |
| KR | 20200042756 | 4/2020 |
| RU | 2618878 | 5/2017 |
| RU | 2682147 | 3/2019 |

OTHER PUBLICATIONS

Russian Office action and Search report issued in RU App. No. 2022106530/11(013529) on Jul. 12, 2024, 5 pages.

* cited by examiner

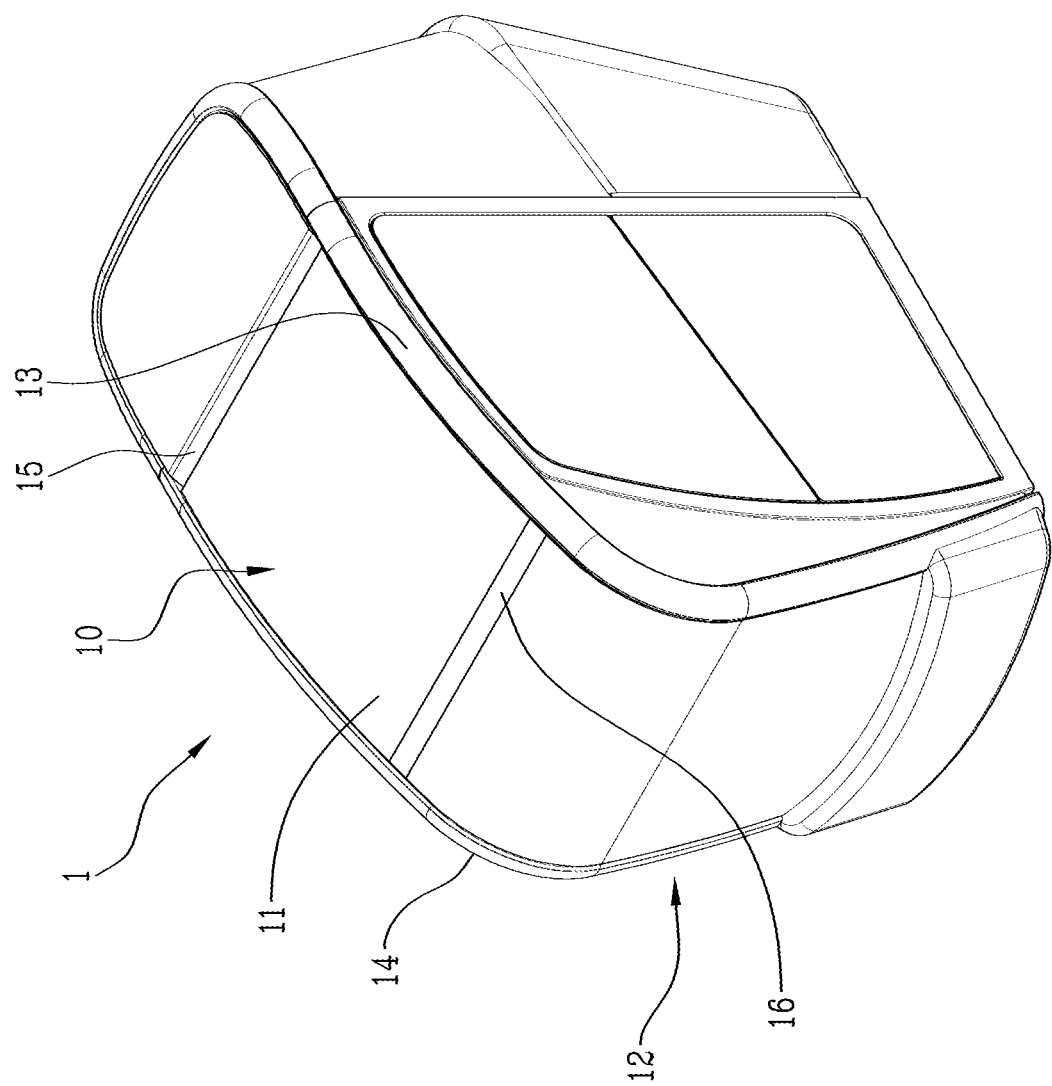

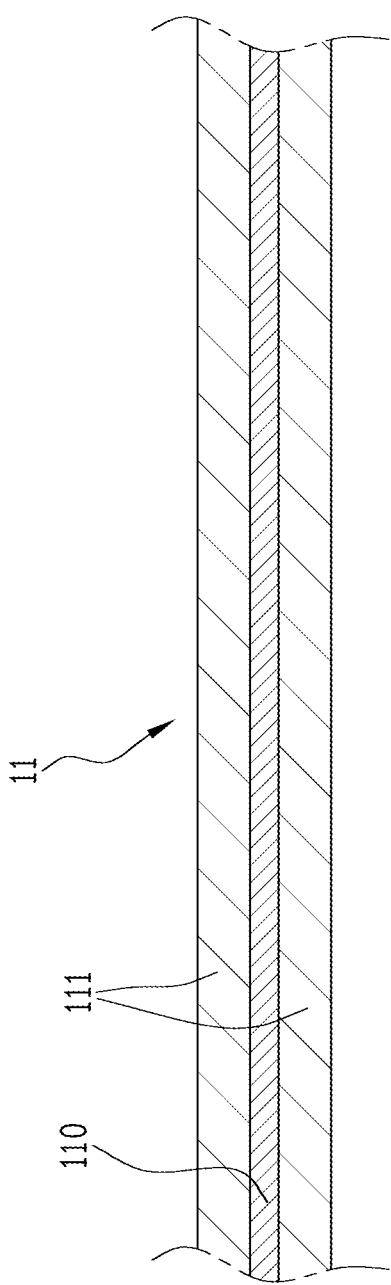
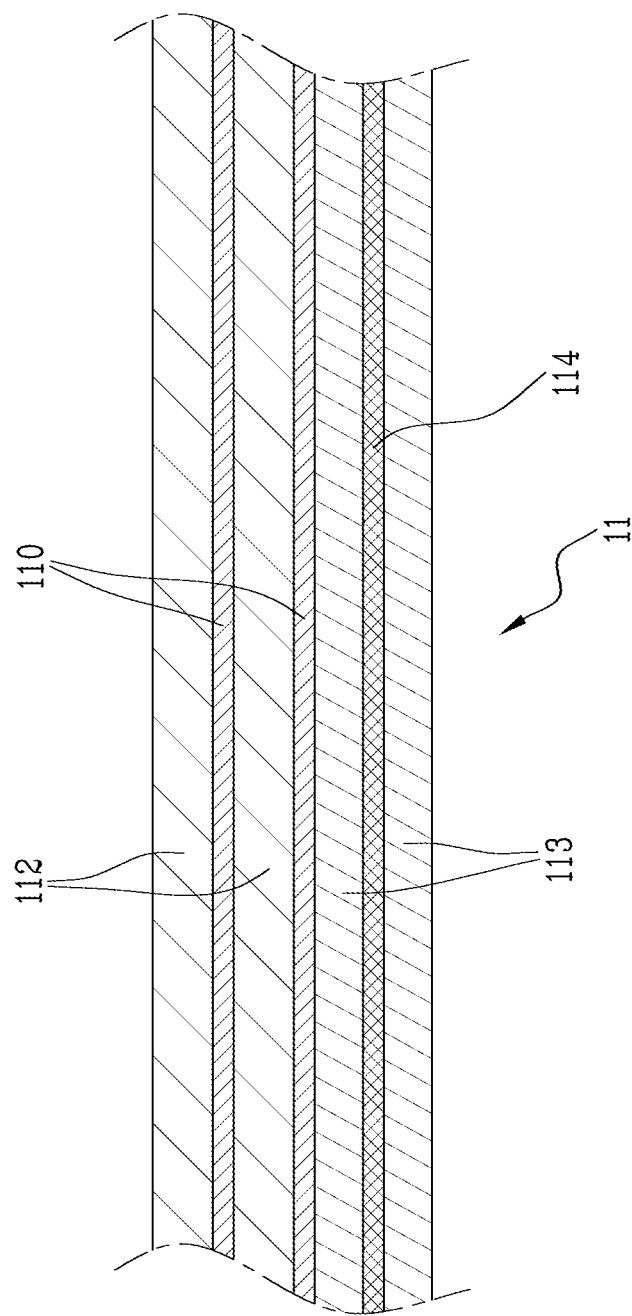

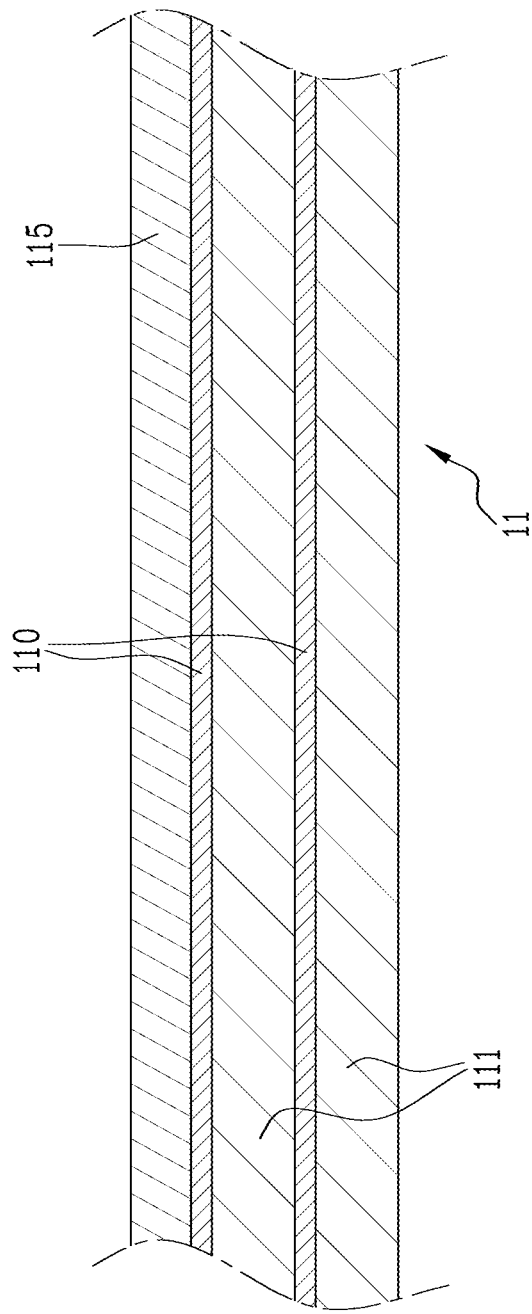
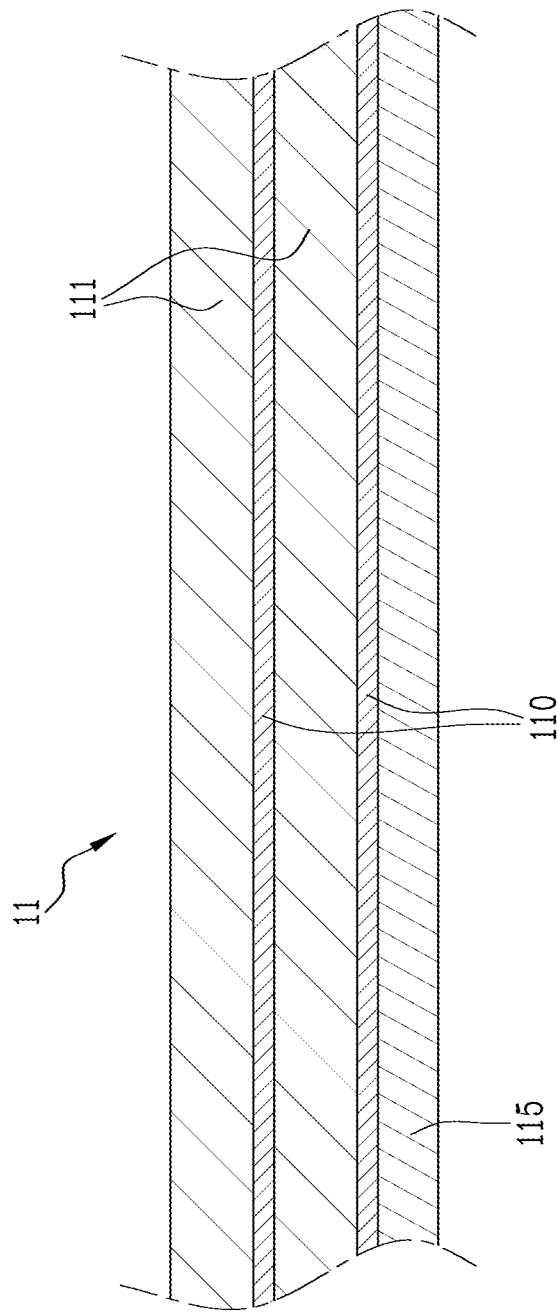

TELEHANDLER PROVIDED WITH IMPROVED CAB

This invention relates to a telehandler equipped with an improved cab. More in detail, the invention relates above all to a cab which is able to provide a better visibility to the operator of the telehandler whilst guaranteeing a level of protection in accordance with the highest standards required by the regulations in the sector and by the market.

Currently, the cabs of telehandlers are provided with a protective grille located at the roof, for example above or below it, which protects the safety of the operator in the event of a fall by gravity on the cab.

A prior art telehandler T, shown in FIG. 1, is provided with a cab C the roof of which is covered above by a grille G designed to protect the operator in cases in which the load or a part of it falls from the gripping equipment, such as a fork F or the like, when this is carried by the operating arm B above the cab C.

Still more in detail, the protective grilles have been designed to satisfy the international standard FOPS ("Falling Object Protective Structures") which specifies the tests which the protective structures must be able to pass.

The reason why a grille G is used and not a continuous plate positioned above the roof is that, in order to perform his work correctly, the operator must be able to directly observe the load during the operating steps in which it is carried above the cab C by the operating arm B.

However, this solution is not completely effective since the grille G is in any case an element which obstructs the view of the operator, even if it does not completely prevent it.

For this reason, the need has been felt for a long time in the market of self-propelled operating machines for a solution which, whilst maintaining the same standard of protection from falling objects and materials, allows an improved view to be provided to the operator of what is located above the roof of the cab.

The technical purpose which forms the basis of the invention is to provide a telehandler equipped with a cab which is able to satisfy the above-mentioned need.

The technical purpose is achieved by the telehandler made according to claim 1.

BRIEF DESCRIPTION OF DRAWINGS

Further characteristics and advantages of the present invention will become more apparent in the non-limiting description of a preferred but non-exclusive embodiment of the proposed telehandler, as illustrated in the accompanying drawings, in which:

FIG. 2 is an axonometric view of the cab according to the invention;

FIG. 3 is a cross-section view of a first embodiment of the protective cover with which the cab of FIG. 2 can be provided;

FIG. 4 is a cross-section view of a different embodiment of the protective cover with which the cab of FIG. 2 can be provided; and FIGS. 5 to 7 are three transversal cross-sections of the cover according to the invention, according to the same number of further embodiments.

Figure 1:
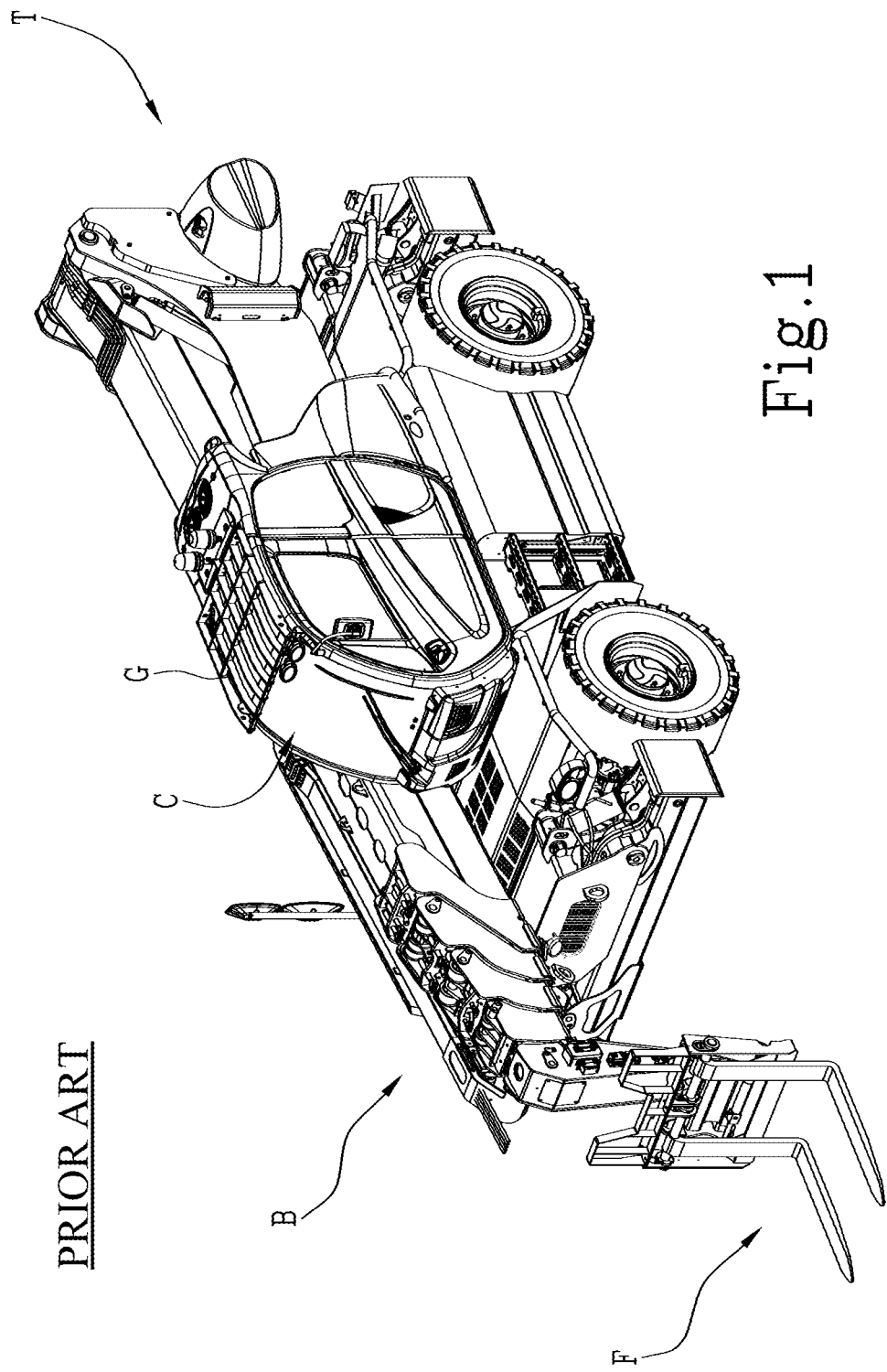
FIG. 1 is an axonometric view of a telehandler equipped with a cab according to the prior art.

The numeral 1 in the accompanying drawings denotes a cab included in a telehandler according to the invention.

The proposed cab 1 is designed for use both with a telehandler of the fixed type and of the rotary type, that is to say, equipped with a rotatable platform mounted on the carriage (or frame) equipped with wheels.

The cab 1 according to the invention does not have a protective grille but is equipped with a roof 10 which is defined by a transparent or semi-transparent transparent protective cover 11 (that is, not totally opaque) designed to withstand the falling of material which is dangerous for the safety of an operator who is on board the cab 1.

In other words, the roof 10 is defined by a cover 11 which is not broken or completely broken through by objects and materials which fall on the roof 10, thereby preventing serious physical injury to the operator.

More specifically, the protective cover 11 has been designed to satisfy the FOPS criteria according to UNI EN ISO 3449:2009, level II and, under the maximum stress specified by this standard, the cover 11 can at most deform and/or break down but does not allow the weight to pass through or bend and thus enter the space occupied by the operator.

In this way, the operator who is on board the proposed cab 1 can observe directly, that is to say, without obstructions, the load and/or the equipment carried by the operating arm when they pass above the cab 1 and at the same time is protected from the accidental falling of objects and materials, for example part of the load, to satisfy, lastly, the market requirements already described during the discussion of the prior art.

More specifically, the protective cover 11 is designed to withstand, in an environment with a temperature of approximately −18 degrees centigrade, an impact of an object which has a kinetic energy substantially equal to 11600 Joules, produced, for example, by an object which weighs substantially 238 kg and falls substantially from 5 metres.

More generally speaking, the cover 11 is designed to withstand, in an environment with a temperature of approximately −18 degrees centigrade, an impact greater than 11000 J and, for example, produced by an object weighing at least 230 kg falling from a height of at least 4 metres.

The protective cover 11 is made from a plurality of layers made of polymeric material, including at least one made of polycarbonate or polyurethane.

Adjacent layers are preferably joined to each other by adhesive. In the context of this description, the term "layer" means one of the parts of the cover of the cab made of a material which contributes to its mechanical strength, therefore not the adhesive or treatment or pre-treatment substances.

According to a first non-limiting preferred embodiment of the invention, shown in FIG. 3, the cover includes only three layers, consisting of a central polyurethane layer 110, an inner polycarbonate layer 111 and an outer polycarbonate layer 111. In this case, the outer and inner layer 111 are located on opposite sides of the central layer 110.

Still more in detail, according to a preferred but non-binding aspect of the invention, each polycarbonate layer 111 has a thickness of between 14.5 and 15.5 millimetres and still more preferably has a thickness of approximately 15 millimetres.

Moreover, again preferably, the polyurethane layer 110 has a thickness of between 1.25 and 1.27 millimetres and, still more preferably, has a thickness of approximately 1.26 mm.

Further aspects of a dimensional nature, relating to this or other embodiments, are discussed below.

According to a different embodiment of the invention, the cover 11 is made like the one described above, except that it also includes, at the upper outer side or lower inner side, two further layers: a polycarbonate layer 110 and a glass layer 115.

Two example versions of this embodiment are shown in FIGS. 5 and 6.

According to the version of FIG. 5, the cover includes the following five layers, starting from the inside of the cab towards the outside: a polycarbonate layer 111, a polyurethane layer 110, a polycarbonate layer 111, a polyurethane layer 110 and a glass or 115 layer. According to the version of FIG. 6, the cover includes the following five layers, starting from the inside of the cab towards the outside: a glass layer 115, a polyurethane layer 110, a polycarbonate layer 111, a polyurethane layer 110 and a polycarbonate layer 111.

Figure 7:
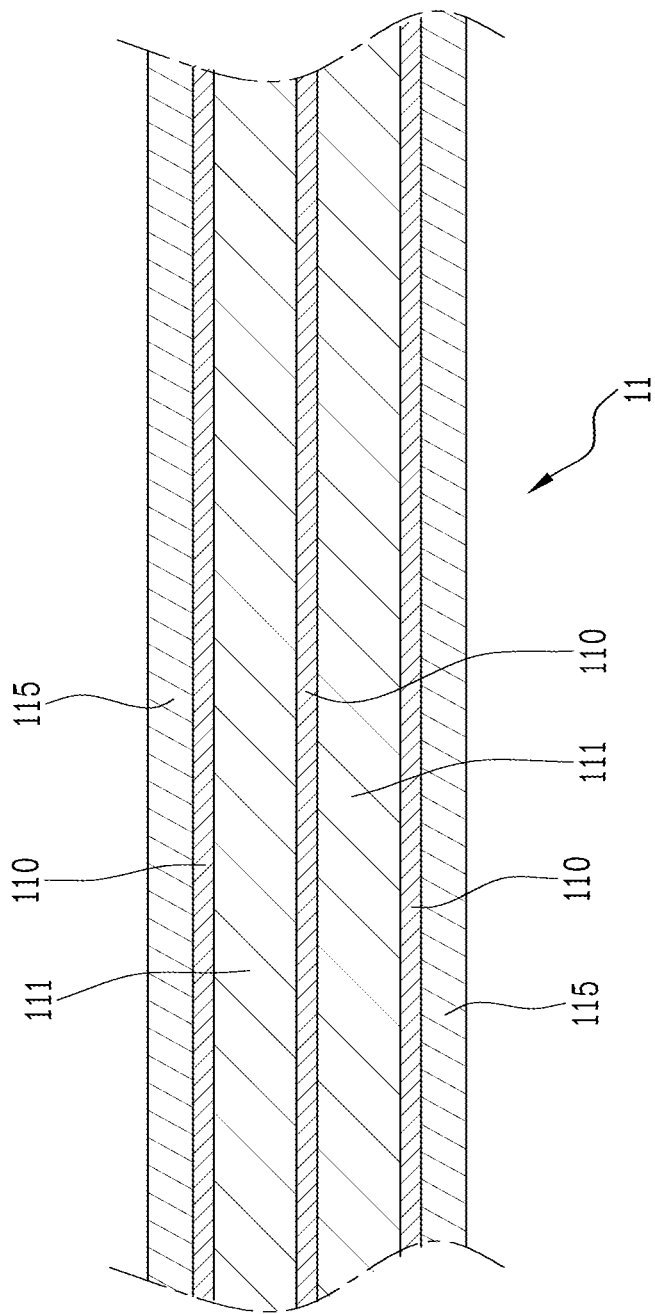

According to a third example version, shown in FIG. 7, the cover includes the following seven layers, starting from the inside of the cab towards the outside: a glass layer 115, a polyurethane layer 110, a polycarbonate layer 111, a polyurethane layer 110, a polycarbonate layer 111, a polyurethane layer 110 and a glass layer 115.

The polyurethane and polycarbonate layers 110, 111 may have the same thicknesses as those of the first embodiment described above and illustrated in FIG. 3, whilst the glass layer 115 may have a thickness of between 1 and 5 mm, preferably between 2.5 and 3.5 mm and still more preferably equal to approximately 3 mm.

According to a further and non-binding embodiment of the invention, the cover includes at least two layers of polyurethane 110 and two layers of polycarbonate 112 alternated with each other. In this case, the cover may include at least one layer of hardened glass 113, preferably positioned more inside the cab 1 relative to the polycarbonate 112 and polyurethane 110 layers and/or may include a composite hurricane resistant layer 114, also this located preferably inside and not outside the cab 1.

More specifically, as shown in FIG. 4, according to a second preferred embodiment of the invention, the cover 11 only includes the succession of the following seven layers: polycarbonate 112, polyurethane 110, polycarbonate 112, polyurethane 110, glass 113, composite hurricane resistant layer 114 and glass 113.

In this case, each polycarbonate layer 112 preferably has a thickness of between 11.5 and 12.5 millimetres and, still more preferably, has a thickness of approximately 12 millimetres. Moreover, again preferably, the polyurethane layer 110 has a thickness of between 1.25 and 1.27 millimetres and, still more preferably, has a thickness of approximately 1.26 mm.

Moreover, preferably, each glass layer 113 has a thickness of between 5.5 mm and 6.5 mm and, still more preferably, has a thickness of approximately 6 mm.

With regard to the composite hurricane resistant layer, 114 this may have a thickness of between 1 and 3 millimetres, preferably between 1.5 and 1.9 mm and even more preferably equal to approximately 1.78 millimetres.

More generally speaking, both according to the above-mentioned two embodiments and according to other embodiments of the proposed inventive concept, each polycarbonate layer may have a thickness of between 10 and 20 millimetres. More in detail, the thickness of the polycarbonate layer may be between 11 and 16 millimetres and, more specifically, may be between 14.5 and 15.5 millimetres, and be, for example, approximately 15 millimetres. Alternatively, each polycarbonate layer may also have a thickness of between 11 and 13 millimetres, more specifically between 11.5 and 12.5 millimetres, such as, for example, approximately 12 millimetres.

As regards the polyurethane layer, it may have a thickness of between 0.5 and 2.5 millimetres, more specifically between 1.2 and 1.3 millimetres and even more in detail between 1.25 and 1.27 millimetres, such as, for example, approximately 1.26 mm.

If the glass is present, each layer may have a thickness of between 4 and 8 millimetres, more specifically between 5.5 mm and 6, 5 mm, such as, for example, approximately 6 mm. If the hurricane resistant layer is present, this may have a thickness of between 1 and 3 millimetres, more in detail between 1.5 and 1.9 mm, such as, for example, approximately 1.78 millimetres.

According to the preferred embodiment shown in FIG. 2, the protective cover 11 constitutes the roof 10 of the cab 1.

There is also the alternative embodiment wherein the cover 11 extends to the front of the cab 1 also forming the windscreen 12. In other words, according to this alternative version (not illustrated) the windscreen 12 and the roof 10 are integrated in a single central and continuous cover 11, which is mounted, at the opposite edges, on two suitably shaped side uprights 13, 14.

Described below is a possible method for making the cab of the proposed telehandler.

A cab framework is made available provided with a frame designed to receive the cover 11 according to the invention, designed according to one of the embodiments described above or other embodiments falling within the proposed inventive concept. The frame is defined by 15, 16, and the uprights 13, 14 of the cab 1.

Along the inner edge of the frame in a corner arranged in it, a shaped annular seat is made for receiving the perimeter edge of the cover 11, for example by means of a recess or chamfer.

A further step of the method consists in positioning in the seat, obtained in the preceding step, a plurality of spacers designed to make contact with the cover 11, in such a way that it is housed in a predetermined position in the frame.

After that, the cover is positioned in the seat, in contact with the spacers and a sealant is applied to fix the cover 11 to the frame.

After a time for partial polymerisation of the sealant, the spacers are removed and a complete polymerisation time is awaited, so as to obtain the cab 1 according to the invention.

Described below are further preferred steps of the method according to the invention.

Before applying the spacers, the surface of the seat for receiving the cover is cleaned and pre-treated.

In detail, it is possible to firstly apply a cleaning and degreasing agent, such as, for example, Simson Cleaner I produced by Bostik, or another similar product, and then apply a pre-treating agent to prepare the surface to receive an adhesive and to define a coating to protect against ultraviolet rays, such as, for example, Simson Prep G produced by Bostik or another product suitable for the purpose.

This preparation sequence may also be performed several times, for example twice. After that, it can be concluded with the application of a preparation agent suitable for increasing the adhesiveness of the sealant, which may be, for example, but not necessarily, Simson Prep M produced by Bostik.

The cleaning agent is left on the surface of the seat for a length of time of from 1 to 20 minutes, before applying the pre-treating agent, preferably for 3 - 7 minutes and more preferably for approximately 5 minutes.

Preferably, the spacers are of a size such as to take into account, in order to position the cover, the thickness of the above-mentioned sealant which may be between 5 and 15 mm, preferably between 8 and 11 mm, and still more preferably, approximately 10 mm.

The sealant may be applied after at least 3 minutes from the application of the above-mentioned preparation agent, preferably after at least 4 minutes and still more preferably after approximately 5 minutes. The sealant may be Simson ISR 70-03 or other equivalent products.

Preferably, the above-mentioned complete polymerisation time is at least 4 days, preferably at least 6 days and even more preferably at least 7 days.

It should be noted that it is preferable to carry out a second step of applying sealant in order to prevent infiltrations, after the cover 11 has been positioned and after the complete polymerisation time has passed.

The complete polymerisation time of the sealant applied for the second time may be the same as that of the sealant previously applied.

It is clear, therefore, that the telehandler which comprises the cab 1 according to the invention has performance levels which cannot be obtained from prior art telehandlers, with obvious advantages in terms of operating convenience and effectiveness and with the full safety of the operator.

The invention claimed is:

1. A telehandler comprising:
    an operating arm having gripping equipment at an end thereof, the gripping equipment being configured to receive an object thereon;
    a cab (1) equipped with a roof (10), a windscreen, a rear spaced from and disposed opposite the windscreen, and a pair of side uprights, said roof and said windscreen being integrated in a single and continuous transparent or semi-transparent protective cover (11) which comprises one or more materials designed to withstand the falling of hazardous material for the safety of an operator onboard the cab (1) to satisfy the FOPS criteria according to UNI EN ISO 3449:2009, level II, said single and continuous transparent or semi-transparent cover including a plurality of at least four layers made of polymeric material, including at least one polycarbonate layer (111, 112) and at least one polyurethane layer (110),
    wherein the operating arm is movable with respect to the cab so as to position the object above the cab,
    wherein the roof is configured to protect an operator if said object falls on the cab, and
    wherein said single and continuous transparent or semi-transparent protective cover extends laterally from a first side upright of the pair of side uprights to a second side upright of the pair of side uprights to provide an unobstructed and continuous view in front of the cab and above the cab;
    wherein said single and continuous transparent or semi-transparent protective cover has an edge at the roof that extends between the first side upright and the second side upright of the pair of side uprights, and the edge at the roof is a rearmost edge of the single and continuous transparent or semi-transparent protective cover, and said edge of said single and continuous transparent or semi-transparent protective cover is spaced from a rear of said cab such that said single and continuous transparent or semi-transparent protective cover can deform or breakdown upon impact of said object but does not allow said object to pass through said single and continuous transparent or semi-transparent protective cover.

2. The telehandler according to claim 1, wherein at least two adjacent layers of the single and continuous transparent or semi-transparent protective cover (11) are joined by an adhesive.

3. The telehandler according to claim 2, wherein all the adjacent layers of the single and continuous transparent or semi-transparent protective cover (11) are fixed one to the next by an adhesive.

4. The telehandler according to claim 2, wherein the single and continuous transparent or semi-transparent protective cover consists of a central polyurethane layer (110), an inner polycarbonate layer (111) and an outer polycarbonate layer (111), said outer polycarbonate layer and said inner polycarbonate layer being positioned on opposite sides of the central polyurethane layer, and a glass layer; wherein the outer polycarbonate layer and the inner polycarbonate layer each has a thickness of approximately 15 millimetres; wherein the central polyurethane layer has a thickness of approximately 1.26 mm; and wherein the central polyurethane layer, the inner polycarbonate layer, and the outer polycarbonate layer are joined to each other by the adhesive.

5. The telehandler according to claim 1, wherein the single and continuous transparent or semi-transparent protective cover includes two polycarbonate layers (111, 112) or polyurethane layers (110).

6. The telehandler according to claim 5, wherein the single and continuous transparent or semi-transparent protective cover includes a polyurethane layer (110) between two polycarbonate layers (111, 112).

7. The telehandler according to claim 6, wherein the single and continuous transparent or semi-transparent protective cover consists of a central polyurethane layer (110), an inner polycarbonate layer (111) and an outer polycarbonate layer (111), said outer polycarbonate layer and said inner polycarbonate layer being positioned on opposite sides of the central polyurethane layer, and a glass layer.

8. The telehandler according to claim 1, wherein the single and continuous transparent or semi-transparent protective cover includes at least two polyurethane layers (110) and two polycarbonate layers alternating with each other (112).

9. The telehandler according to claim 8, wherein the single and continuous transparent or semi-transparent protective cover includes a glass layer (113), and wherein the glass layer (113) is positioned further inside the cab (1) than the polycarbonate layers and polyurethane layers.

10. The telehandler according to claim 8, wherein the single and continuous transparent or semi-transparent protective cover includes a glass layer (113); wherein the glass layer (113) is positioned further inside the cab (1) than the polycarbonate layers and the polyurethane layers; wherein the single and continuous transparent or semi-transparent protective cover includes a composite hurricane resistant layer (114); wherein each polycarbonate layer has a thickness of between 10 and 20 millimetres, each glass layer has a thickness of between 4 and 8 millimetres, and each polyurethane layer has a thickness of between 0.5 and 2.5 millimetres; and wherein the single and continuous transparent or semi-transparent protective cover consists only of the succession of the following seven layers: polycarbonate layer (112), polyurethane layer (110), polycarbonate layer (112), polyurethane layer (110), glass layer (113), composite hurricane resistant layer (114) and glass layer (113).

11. The telehandler according to claim 1, wherein the single and continuous transparent or semi-transparent protective cover includes a glass layer (113).

12. The telehandler according to claim 11, wherein the glass layer has a thickness of between 4 and 8 millimetres.

13. The telehandler according to claim 12, wherein the glass layer has a thickness of between 5.5 mm and 6.5 mm.

14. The telehandler according to claim 11, wherein the glass layer has a thickness of between 1 and 5 mm.

15. The telehandler according to claim 1, wherein the single and continuous transparent or semi-transparent protective cover includes a composite hurricane resistant layer (114).

16. The telehandler according to claim 1, wherein each polycarbonate layer has a thickness of between 10 and 20 millimetres.

17. The telehandler according to claim 16, wherein each polycarbonate layer has a thickness of between 11 and 16 millimetres.

18. The telehandler according to claim 17, wherein each polycarbonate layer has a thickness of between 11 and 13 millimetres.

19. The telehandler according to claim 16, wherein each polycarbonate layer has a thickness of between 14 and 16 millimetres.

20. The telehandler according to claim 19, wherein each polycarbonate layer has a thickness of between 14.5 and 15.5 millimetres.

21. The telehandler according to claim 1, wherein each polyurethane layer has a thickness of between 0.5 and 2.5 millimetres.

22. The telehandler according to claim 21, wherein each polyurethane layer has a thickness of between 1.2 and 1.3 millimetres.

23. The telehandler according to claim 22, wherein each polyurethane layer has a thickness of between 1.25 and 1.27 millimetres.

24. A telehandler comprising:
an operating arm having gripping equipment at an end thereof, the gripping equipment being configured to receive an object thereon;
a cab (1) equipped with a roof (10), a windscreen, a rear spaced from and disposed opposite the windscreen, and a pair of side uprights, said roof and said windscreen being a single and continuous transparent or semi-transparent protective cover, said single and continuous transparent or semi-transparent cover includes at least four layers in total including a plurality of layers made of at least one glass layer, and polymeric material that comprises a polycarbonate layer and a polyurethane layer,
wherein the operating arm is movable with respect to the cab so as to position the object above the cab,
wherein the roof is configured to protect an operator if said object falls on the cab, and
wherein said single and continuous transparent or semi-transparent protective cover extends laterally from a first side upright of the pair of side uprights to a second side upright of the pair of side uprights to provide an unobstructed and continuous view in front of the cab and above the cab;
wherein said single and continuous transparent or semi-transparent protective cover has an edge at the roof that extends between the first side upright and the second side upright of the pair of side uprights, and the edge at the roof is a rearmost edge of the single and continuous transparent or semi-transparent protective cover, and said edge of said single and continuous transparent or semi-transparent protective cover is spaced from a rear of said cab such that said single and continuous transparent or semi-transparent protective cover can deform or breakdown upon impact of said object but does not allow said object to pass through said single and continuous transparent or semi-transparent protective cover.

25. The telehandler according to claim 24, wherein the single and continuous transparent or semi-transparent cover is designed to withstand, in an environment with a temperature of approximately −18° C., an impact greater than 11000 J produced by an object weighing at least 230 kg falling from a height of at least 4 meters.

26. The telehandler according to claim 24, wherein the single and continuous transparent or semi-transparent cover consisting of a central polyurethane layer, an inner polycarbonate layer and an outer polycarbonate layer, said outer polycarbonate layer and said inner polycarbonate layer being positioned on opposite sides of the central polyurethane layer, and the at least one glass layer is positioned further inside the cab than the the inner polycarbonate layer, the outer polycarbonate layer, and the central polyurethane layer.

27. The telehandler according to claim 26, wherein the outer polycarbonate layer and the inner polycarbonate layer each has a thickness of between 14 and 16 millimetres and the central polyurethane layer has a thickness of between 1.2 and 1.3 millimetres and the at least one glass layer has a thickness of between 4 and 8 millimetres.

* * * * *